United States Patent [19]

Strong et al.

[11] 4,410,947
[45] Oct. 18, 1983

[54] VEHICLE PROPULSION CONTROL APPARATUS AND METHOD

[75] Inventors: John D. Strong, Mt. Oliver; Thomas C. Matty, North Huntingdon, both of Pa.

[73] Assignee: Westinghouse Electric Corp., Pittsburgh, Pa.

[21] Appl. No.: 279,929

[22] Filed: Jul. 2, 1981

[51] Int. Cl.³ .................... G06F 15/20; H02P 5/00
[52] U.S. Cl. .................... 364/426; 364/424; 246/182 B; 361/238; 180/197; 318/52
[58] Field of Search .............. 364/424, 426; 246/182 B; 318/52, 434; 361/238; 180/197; 303/93, 106

[56] References Cited

U.S. PATENT DOCUMENTS

| | | | |
|---|---|---|---|
| 3,069,606 | 12/1962 | Pastoret et al. | 318/52 |
| 3,783,339 | 1/1974 | Matty | 318/683 |
| 4,071,282 | 1/1978 | Callahan et al. | 361/238 |
| 4,095,147 | 6/1978 | Mountz | 318/52 |
| 4,095,153 | 6/1978 | Matty et al. | 318/376 |
| 4,190,220 | 2/1980 | Hahn et al. | 246/182 B |
| 4,235,402 | 11/1980 | Matty et al. | 246/182 B |
| 4,282,466 | 8/1981 | Matty | 318/434 |
| 4,347,569 | 8/1982 | Allen, Jr. et al. | 364/426 |

OTHER PUBLICATIONS

"Propulsion Control for Passenger Trains Provides High-Speed Service" Published in the Westinghouse Engineer in Sep. 1970, pp. 143–149.

"Alternative Systems for Rapid-Transit Propulsion and Electrical Braking" Published in the Westinghouse Engineer in Mar. 1973, pp. 34–41.

Primary Examiner—Gary Chin
Attorney, Agent, or Firm—R. G. Brodahl

[57] ABSTRACT

In the control of adhesion between a vehicle and a track, an adaptive control is provided for reapplying the tractive effort between the vehicle and the track in accordance with the known tractive effort level at which a loss of adhesion was sensed.

10 Claims, 8 Drawing Figures ic,947

VEHICLE PROPULSION CONTROL APPARATUS AND METHOD

CROSS-REFERENCE TO RELATED APPLICATION

The present application is related to a patent application Ser. No. 902,001 now U.S. Pat. No. 4,282,466 that was filed Apr. 27, 1978 by T. C. Matty and entitled Transit Vehicle Motor Effort Control Apparatus and Method, which is assigned to the same assignee and the disclosure of which is incorporated herein by reference.

BACKGROUND OF THE INVENTION

In an article entitled Alternative Systems For Rapid Transit Propulsion And Electrical Braking, published in the Westinghouse Engineer for March, 1973, at pages 34–41, there is described a thyristor chopper control system for propulsion and electrical braking of transit vehicles. The thyristor chopper provides a propulsion system that is superior in smoothness and ease of maintaining a given speed, which latter feature is desired for automatic train control.

It is known in the prior art to operate a vehicle propulsion motor with a programmed microprocessor controlling a chopper that determines the average current of that motor as described in the above cross referenced patent application and in U.S. Pat. No. 4,095,153 of T. C. Matty, et al.

It is known in the prior art to provide a slipslide control system for a vehicle, such as a transit car, as described in an article published in The Westinghouse Engineer for September, 1970 at pages 143–149, wherein once a pair of wheels is slipping or sliding then corrective action is taken to reduce the tractive or braking effort applied to the axle to permit those wheels to regain the speed equivalent to train speed. The desired tractive or braking effort is then reapplied.

U.S. Pat. No. 3,069,606 discloses the utilization of an auxiliary field for a DC traction motor arranged in a bridge circuit and operative with a train vehicle to respond to differences in the speeds of selected motors to limit the motor speed for protecting a motor against excessive voltage and excessive speed.

U.S. Pat. No. 3,783,339 discloses the provision of two tachometers coupled with a moving vehicle, such that the output of a first tachometer leads the signal provided by the second when the vehicle is traveling forward and the output of the second tachometer leads the signal provided by the first when the vehicle is traveling in a reverse direction, for the purpose of controlling the movement of the vehicle.

SUMMARY OF THE INVENTION

In response to a sensed predetermined difference between the speeds of the wheels of a moving vehicle, as determined by respective tachometers coupled with the vehicle wheels, when a loss of tractive effort occurs, the propulsion motor currents are reduced and then reapplied at one or more adaptively controlled rates in accodance with the level of tractive effort at which that loss occurred for minimizing the resulting lost tractive effort time product.

DESCRIPTION OF THE PREFERRED EMBODIMENT

Figure 1:
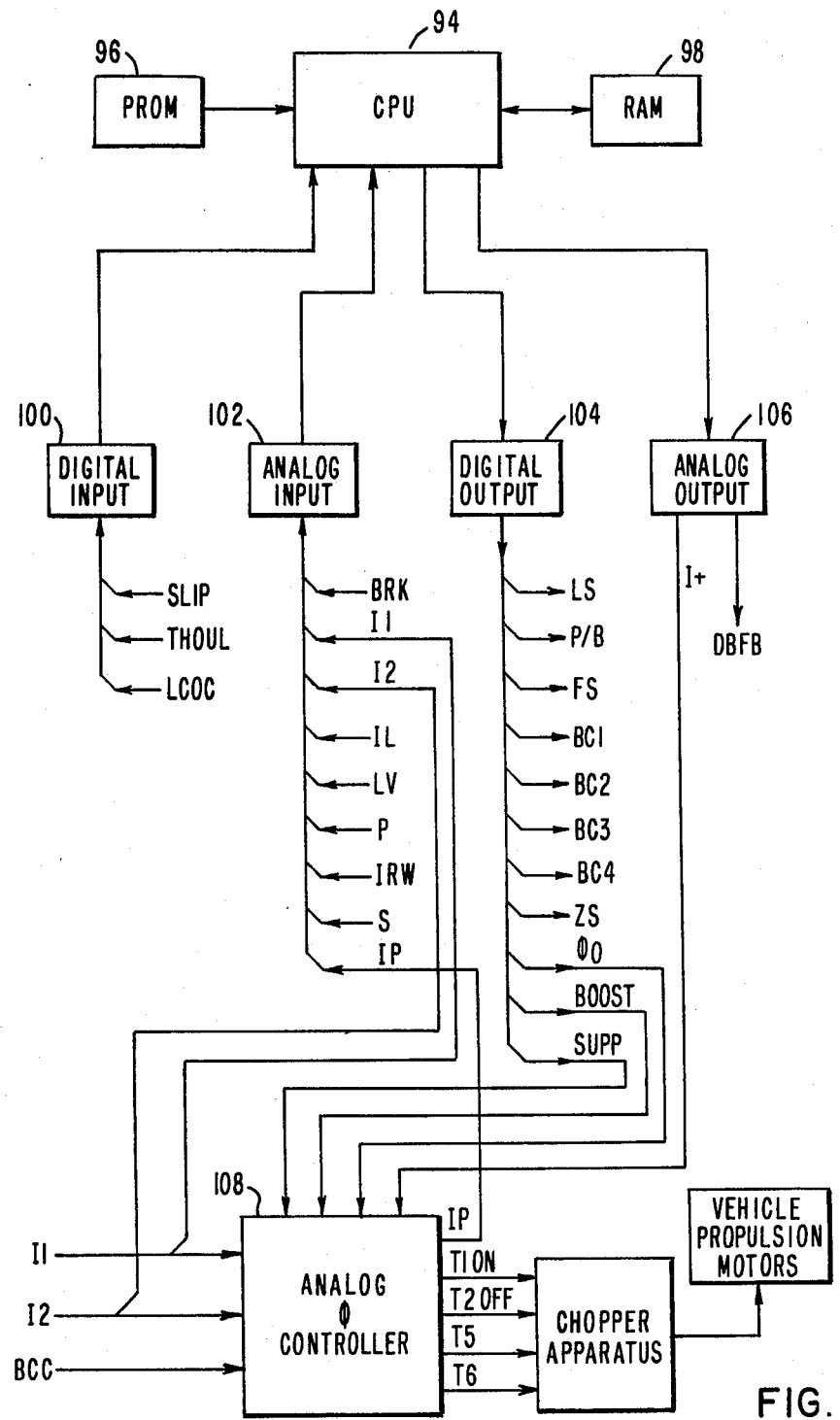
FIG. 1 functionally shows a prior art propulsion motor control apparatus in relation to input signals and output signals operative with the motor control apparatus.

In FIG. 1 there is shown a functional illustration of the prior art vehicle motor control apparatus in relation to the input signals and the output signals generally operative therewith, and including a CPU microprocessor 94 operative with a PROM programmable memory 96 and a scratch pad RAM random access memory 98 used for intermediate storage. An application control program, such as the program listing included in the Appendix, is stored in the programmable memory 96. The microprocessor 94 can be an INTEL 8080, the random access memory 98 can be an INTEL 8108, and the programmable memory 96 can be an INTEL 1702 programmable read only memory, which items are currently available in the open marketplace. There are four illustrated general categories of input and output signals relative to the processor controlled operation of a transit vehicle. The digital input signals are supplied through digital input 100 from the transit vehicle and include the slip/slide signal SLIP, the thyristor temperature sensor thermal overload signal THOUL, and the one or more power circuit condition indication signals LCOC. The analog input signals are supplied through analog input 102 and include the first propulsion motor leg current I1, the second propulsion motor leg current I2, the line current IL, the line voltage LV, the primary power request or brake request control signal P, the mode request signal BRK, the air pressure in the vehicle support bag members providing load weighed current request signal IRW, the analog phase signal IP and the vehicle actual speed signal S. The digital output signals are supplied through digital output 104 to the controlled transit vehicle and include the line switch control signal LS, the power brake mode control signal P/B, the field shunt control signal FS, the first braking resistor control signal BC1, the second braking resistor control signal BC2, the third braking resistor control signal BC3, the fourth braking resistor control signal BC4, the phase zero control signal $\phi_o$, the timing signal BOOST, the ON suppress control signal SUPP and the zero speed signal ZS. The analog output current request signal I+ is supplied through analog output 106 going to an analog phase controller 108, which is operative to supply the control signal ON to fire the chopper thyristor T1, the control signal OFF to fire the commutating chopper thyristor T2, the control signal T5 for the T5 thyristor in the propulsion motor control chopper apparatus, the thyristor control signal T6 and the analog phase indication signal IP going to analog input 102. The time period associated with turning the chopper ON and OFF is at a constant frequency of 283 Hz, that defines the clock time interval for the program cycle and for checking the process operation. During each of the 283 time intervals per second, the program cycle operates through the application program. It was necessary in the prior art for some of the input signals to be filtered to slow down the effects of noise transients and the like, but the computer program now samples the input signals 283 times every second, so if desired each signal can be checked during each program cycle and if the signal stays the same as it was before the proper response can be provided.

The master controller provides a tractive effort request to the train control system operative with each vehicle, and provides a P signal which selects a desired propulsion effort. This signal goes from 0 to 100 milliamps and establishes how much propulsion power or braking effort is desired by a particular train vehicle. The P signal is decoded to determine the proper motor current to generate the proper tractive effort. In addition, there is a confirming signal, called the BRK signal which determines when the propulsion power and when braking effort is applied. The purpose of the BRK signal is to control the power switching at the correct time to avoid one car braking while another car is in propulsion. Contact closures in the power circuitry are detected to establish that the power contacts have been made up properly and to readjust the settings in the logic. For instance, in field shunt operation, the amount of motor current is adjusted to keep from getting an undesired physical jerk of the vehicle. A failsafe reading of the P signal level is made such that, should the P signal be lost, the train control automatically goes into a brake mode. The prior art propulsion control apparatus determines which switches to close and when to close them to modify the power circuit properly. A dynamic brake feedback signal DBFB is sent to the mechanical brake control from the analog output 106 for providing the blending of mechanical brake necessary to maintain the deceleration level required by the P signal. The P signal is in reality a vehicle acceleration or deceleration request.

The propulsion control apparatus shown in FIG. 1 provides output pulses to the main power thyristors to tell them when to turn ON and when to turn OFF. When a command signal is sensed, for example, if the vehicle is in propulsion or power mode and the command signal desires the vehicle to brake, the control apparatus senses any difference between the desired motor current and the actual motor current and ramps down the actual current as required. When the current gets down to a desired level, the control apparatus opens all the propulsion switches and reconnects for a brake operation, then ramps the motor current back up again to the level established by the desired brake operation.

Figure 2:
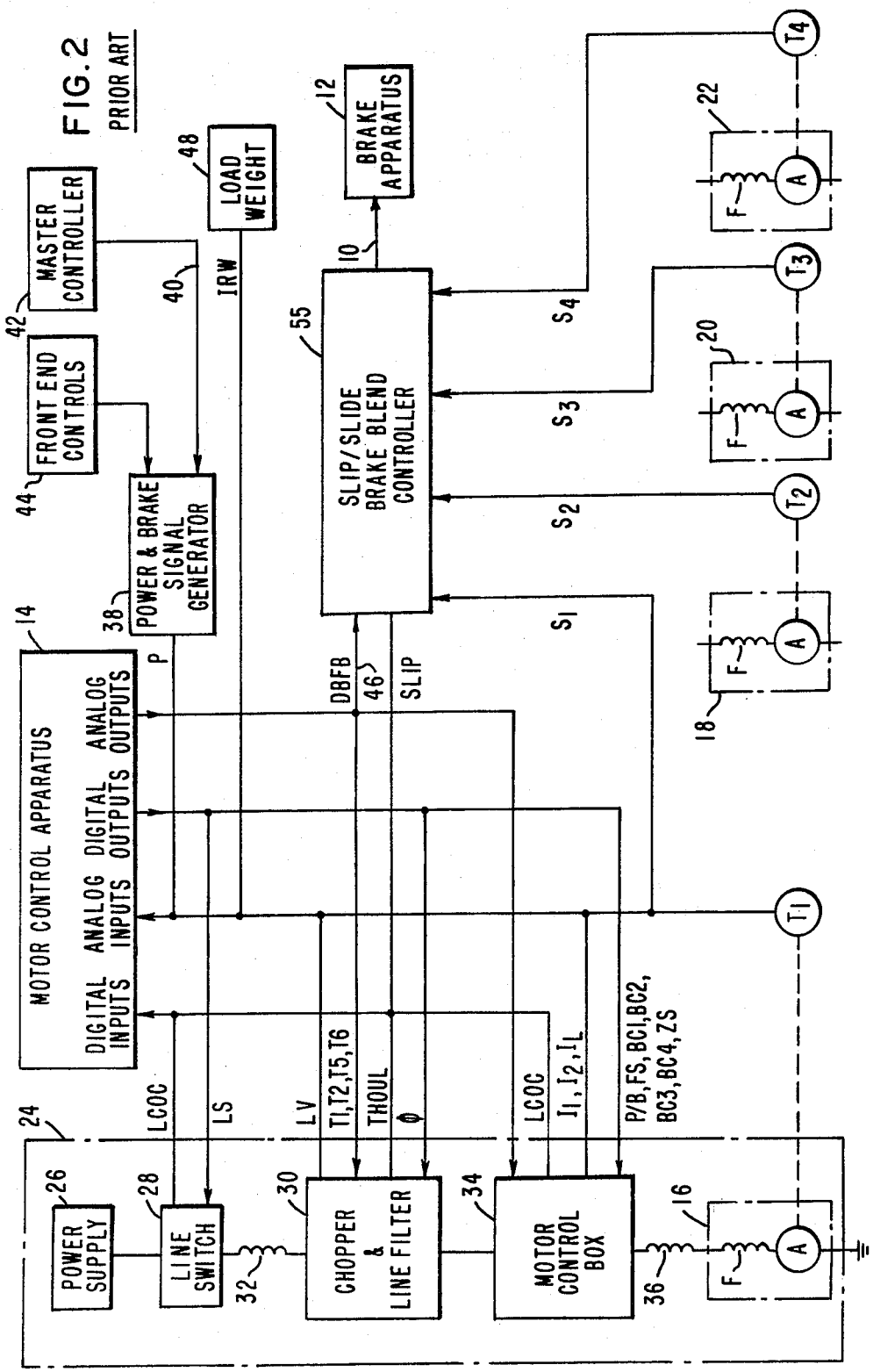
FIG. 2 illustrates the operation of the prior art slip/slide control apparatus.

The prior art propulsion motor control apparatus of FIG. 2 has a power circuit 24 which includes the power supply 26 connected through the relay operated line switch 28 to the chopper and line filter 30. The motor control apparatus 14 controls the line switch 28 with the signal LS, and the status of the line switch is fed back through the indication signal LCOC to the motor control apparatus 14. The power supply 26 can have a nominal rating of 750 volts, but can vary above 900 volts and down to about 450 volts. During motor braking, regeneration is determined as a function of filter capacitor voltage. At above 975 volts the line switch opens. The line reactor 32 operates to smooth out current changes. The motor control box 34 is utilized to set up the motor circuit in either power or brake and to adjust the braking resistors during brake. The motor reactor 36 then connects with the propulsion motor 16.

The power and brake signal generator 38 provides an output tractive effort controlling P signal to the motor control apparatus 14 in response to a tractive effort request signal 40 from the operator's master controller 42. The front end controls 44 are provided to enable or disable the generator 38 in response to inputs, such as an overspeed condition to clamp the P signal to a low level value. The motor current apparatus 14 provides a feedback output signal DBFB indicative of the level of electric dynamic braking effort, as determined by sensed motor currents in the brake mode of operation. The load weight sensor 48 provides an input signal to the motor control apparatus 14 in accordance with the weight of the vehicle.

In FIGS. 1 and 2 there is shown a prior art motor control apparatus coupled with the vehicle carried motor and brake control apparatus components as well known to persons skilled in the art. Four tachometers $T_1$, $T_2$, $T_3$ and $T_4$ are shown in FIG. 2, which are respectively coupled with the four drive motors and support wheel axles of the vehicle. The slip/slide brake blend controller 55, which can be a well known Westinghouse Air Brake Co. Model F2 Unit, Part No. 585819 and shown by drawing EA 8515-51, that is presently available in the open market, responds to the speed signal from each of the tachometers $T_1$, $T_2$, $T_3$ and $T_4$ to sense a predetermined difference between any two of the provided speed signals to establish that one of a slip or a slide operational condition of the vehicle is occurring. A slip occurs during acceleration and a slide occurs during braking of the vehicle. The slip/slide controller 55 provides an output 10 for controlling the pneumatic brake apparatus 12 of the vehicle and provides a signal SLIP to the digital input of the motor control apparatus 14 for removing the tractive effort provided by the propulsion motors of the vehicle, which are schematically shown as motors 16, 18, 20 and 22 in FIG. 2. It should be understood that a power circuit, similar to the illustrated power circuit 24, is also provided for each of the motors 18, 20 and 22 and operative with the motor control apparatus 14. The brake apparatus 12 can include tread brakes operative with the outside of the vehicle wheels and responsive to changes in controlling air pressure as determined by the slip/slide controller SS. The slip/slide controller SS provided signal SLIP to the digital input of the motor control apparatus 14, depending upon whether the vehicle is in power or brake mode, causes the motor control apparatus 14 to back off on the current to the motors 16, 18, 20 and 22 and then reapply that motor current at a predetermined jerk-limited rate.

The prior art motor control arrangement shown in FIGS. 1 and 2 is commercially in use at the present time as part of the east-west line of the Sao Paulo Brazil Metro, which is discussed in an article published in the Conference Record of the IAS Annual Meeting of the IEEE Industry Applications Society for October 1977, at pages 1105-1109.

Figure 3:
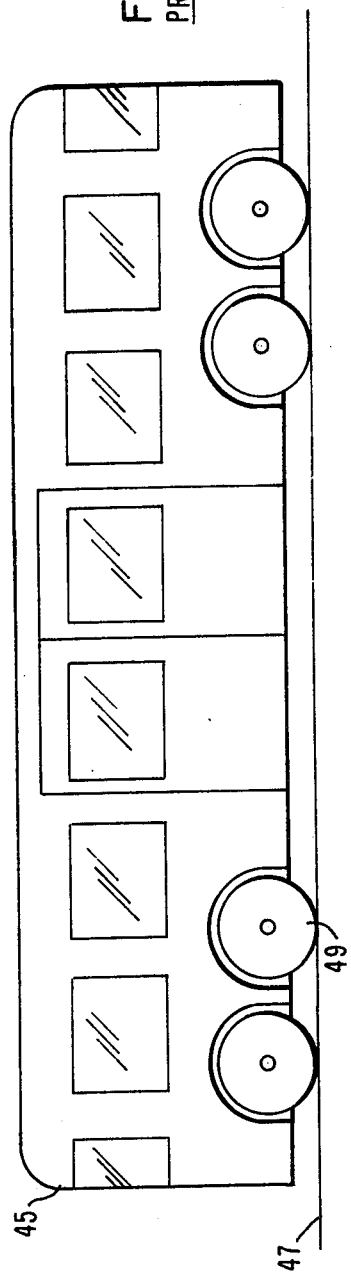
FIG. 3 shows a side view of a prior art transit vehicle operative with a roadway track.

In FIG. 3 there is shown a prior art transit vehicle 45 operative with a roadway track 47. When the vehicle 45 is operating under conditions of limited adhesion between the wheels 49 and the roadway track 47, it is the prior art practice to sense this condition in relation to a predetermined difference in selected wheel speeds and to remove the tractive effort applied through the wheels and then reapply this tractive effort at a constant jerk limited rate such as 2 miles per hour per second that was used for normal operation of the vehicle. If an adhesion limit were again reached, the tractive effort would be removed and then reapplied at the same normal rate. This was repeatedly done until the adhesion limit problem no longer occurred.

Figure 4:
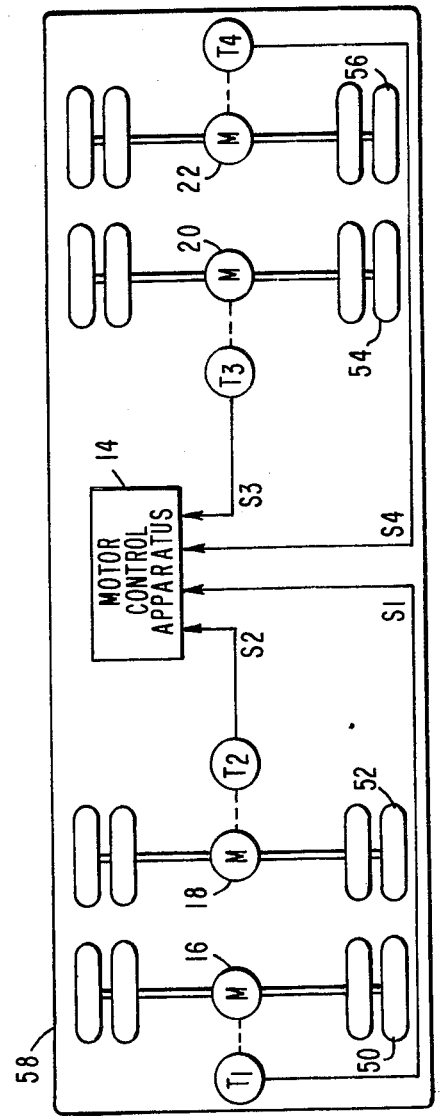
FIG. 4 shows a bottom view of a prior art transit vehicle including a speed sensing tachometer coupled with each motor driven wheel and axle assembly.

In FIG. 4 there is illustrated one prior art arrangement of the drive motors 16, 18, 20 and 22 coupled with respective axles and wheel units 50, 52, 54 and 56. The motor control apparatus 14 carried by the vehicle 58 responds to two or more of the respective motor speed signals S1, S2, S3 and S4, preferably with at least one from each end of the vehicle.

Figure 5:
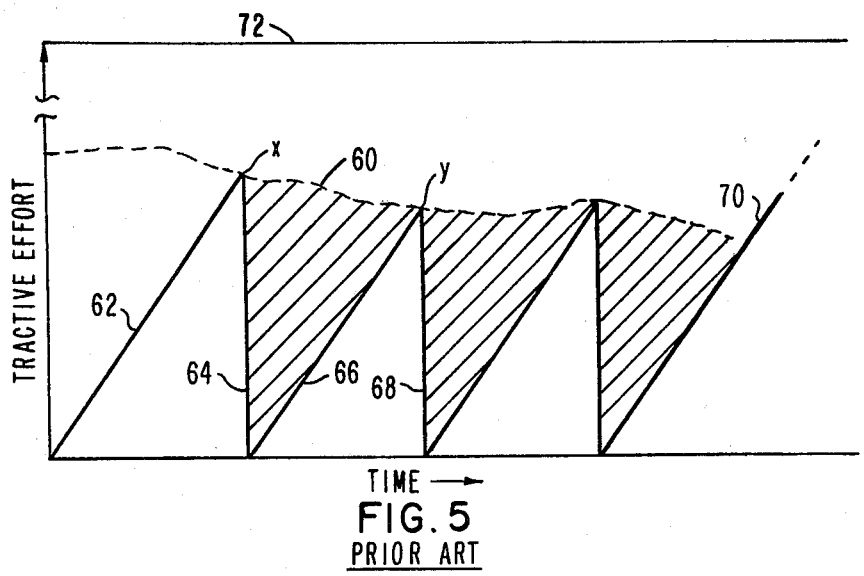
FIG. 5 schematically illustrates the prior art slip/slide control operation for propulsion motor control apparatus in accordance with the signal operation of FIG. 1.

In FIG. 5 there is shown a plot of acceleration rate versus time to illustrate the prior art slip/slide control of vehicle propulsion motors. In response to the P signal, a jerk limited application of tractive effort is applied to the vehicle by the motors 16, 18, 20 and 22 at a rate such as 2 miles per hour per second in accordance with curve section 62. When a slip or slide condition is sensed, which occurs when the adhesion limit 60 is reached, the signal SLIP is activated by the controller 55 and is supplied to the motor control apparatus. The applied tractive effort, is then removed to zero in accordance with curve section 64. The tractive effort is then reapplied at the same rate in accordance with curve section 66 until the adhesion limit is reached at location Y on the curve 60, where the tractive effort again goes to zero in accordance with curve section 68. This operation is repeated until the adhesion limit condition shown by curve 60 discontinues such that the applied tractive effort at the same constant jerk rate of curve section 70 increases up to the requested acceleration rate shown by curve 72. If there were no more slip conditions, the applied tractive effort would then level off in accordance with the curve 72. The tractive effort force applied to the vehicle can be determined by multiplying the acceleration rate times the mass of the vehicle.

Figure 6:
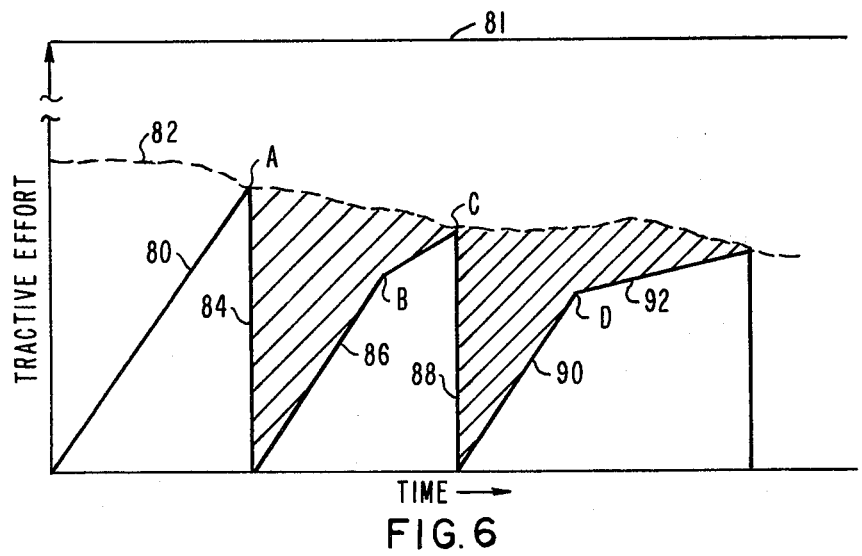
FIG. 6 schematically illustrates the present slip/slide control operation for propulsion motor control apparatus including the provision of the plurality of wheel speed signals to the slip/slide brake blend controller.

In FIG. 6 there is shown the here provided tractive effort control operation in accordance with the present invention. The applied tractive effort as shown by curve section 80 is removed to zero as shown by curve section 84 if a particular wheel-axle unit such as unit 52 shown in FIG. 3 is sensed to be slipping at location A on the adhesion limit curve. The CPU 94 shown in FIG. 1 within the motor control 14 shown in FIG. 2, is programmed to remember in storage the value of the tractive effort at location A on adhesion limit curve 82, and then adaptively controls the rate or rates at which tractive effort is reapplied in order to minimize and reduce the resulting lost tractive effort time product.

Included in the appendix A is a program listing operative with an Intel 8080 microprocessor 94 to provide the slip/slide responsive tractive effort control of vehicle motors in accordance with the present invention as shown in FIG. 6. In the program TER is the tractive effort request and TERJ is the jerk limited tractive effort request signal that determines the output current request signal I+ that is supplied to the analog phase controller within the motor control apparatus 14 for determining the control signal T1 to fire the chopper main thyristor ON, the control signal T2 to fire the commutating thyristor ON and turn OFF the main thyristor and the control signal T5 for the turn ON of the dynamic brake thyristor, as shown in the above referenced published article in the Westinghouse Engineer for March 1973. In the program TERJS corresponds with the location A shown in FIG. 6 where the adhesion limit is reached and the wheel-axle unit slips or slides depending on operation in power or brake mode. The value of the tractive effort TERJS establishes the break point shown as location B in FIG. 6 which governs the rate at which the tractive effort is reapplied. For example the tractive effort increase rate in accordance with curve section 86 can be the same as the tractive effort increase rate or vehicle acceleration of about 2 MPHPS of curve section 80. At B, which is about 0.825 of the tractive effort at location A, the vehicle acceleration rate shown by curve section 87 is selected to be more gradual such as 1 MPHPS in power and 0.5 MPHPS in brake in an effort to avoid another loss of adhesion condition and keep the vehicle moving along the roadway track. If the adhesion limit curve 82 is again reached at tractive effort C, then the tractive effort applied to the vehicle is removed as shown by curve section 88. The tractive effort is then again applied to the vehicle in accordance with curve section 90 at a higher than normal rate such as 2.25 MPHPS until a tractive effort known to be a predetermined fraction such as 0.825 times the last known adhesion limit C has been reached. The acceleration in accordance with curve section 92 is then followed, such as 0.5 MPHPS in power and 0.25 MPHPS in brake, in an effort to avoid another loss of adhesion. This operation is repeated until the adhesion limit 82 no longer is present.

It is desired that the blank area shown in FIG. 6 under the curve 82 and without cross hatching should be maximized, since tractive effort is being applied in relation to this blank area under the curve 82.

When the microprocessor 94 in response to the signal SLIP determines that there is a loss of adhesion in relation to curve 82 shown in FIG. 6, the level of tractive effort at which the loss occurred, such as successively location A, then B, then C, then D, etc., is remembered. A subsequent brake point or knee, such as B, which can typically be about 0.825 times A, is used to delineate the following two jerk limited rates at which tractive effort is reapplied and is set on the basis of the previous remembered adhesion limit. If this is the first loss of adhesion at location A since the requested level of tractive effort was obtained, values are set for: Jerk Limited RATE 1 of about 2 MPHPS which is applied up to the knee B and jerk limited RATE 2 of about 1 MPHPS in power and 0.5 MPHPS in brake which is applied after the knee B. RATE 1 can be set higher such as 3 MPHPS in power than the normal jerk rate of about 2 MPHPS in power shown by curve Section 80 and RATE 2 is typically lower, such as 1 MPHPS in power and 0.5 MPHPS in brake, than the normal jerk rate in order to maximize the blank area under the desired tractive effort versus time curve 81.

If adhesion is lost again before the requested level of tractive effort shown by curve 81 is achieved, the microprocessor 94 again remembers the adhesion limit level of tractive effort, sets the level of the following knee and removes tractive effort. This time, RATE 1 and RATE 2 are modified in order to increase the blank area under the desired tractive effort versus time curve 81. To accomplish this, RATE 1 is increased and RATE 2 is decreased. This process continues repeatedly until the requested level of tractive effort as shown by curve 81 is achieved.

Figure 7:
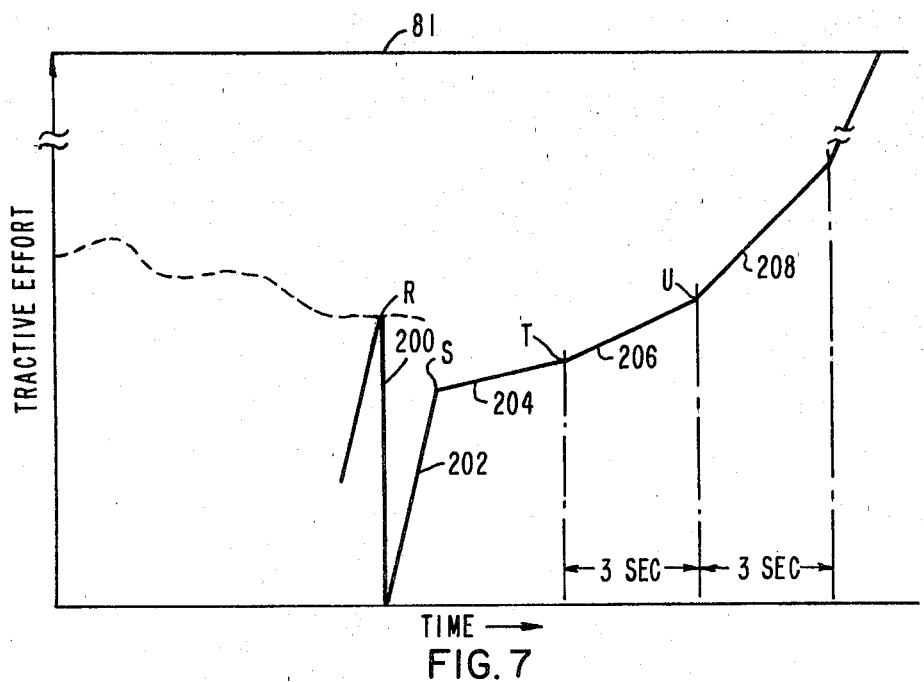
FIG. 7 illustrates a modified operation of the present slip/slide control apparatus.

In FIG. 7, there is illustrated the operation of the program listing included in Appendix B, which is operative with the microprocessor 94 to provide a doubling of the acceleration rate for each of predetermined time intervals that occur after a previous slip or slide and without another slip or slide condition, as sensed by the slip/slide brake blend controller SS. For example, in FIG. 7, there is shown a previous loss of adhesion at location R, and the tractive effort is removed as shown by curve section 200. The tractive effort is again applied as shown by curve section 202 until location S, which can be 0.825 times R, has been reached. Then a lower acceleration as shown by curve section 204 is followed for a predetermined time period, such as 3 seconds and assuming no slip or slide condition is detected. At location T, the acceleration rate of curve section 204 is doubled to determine the acceleration rate of curve section 206. Then after this same time period, if no slip or slide condition is detected, at location U the acceleration rate is again doubled for curve section 208. This same operation is repeated for up to five such time periods without sensing another slip or slide condition, when the vehicle acceleration rate goes back to the original normal rate, such as 2 MPHPS up to the desired tractive effort shown by curve 81.

Figure 8:
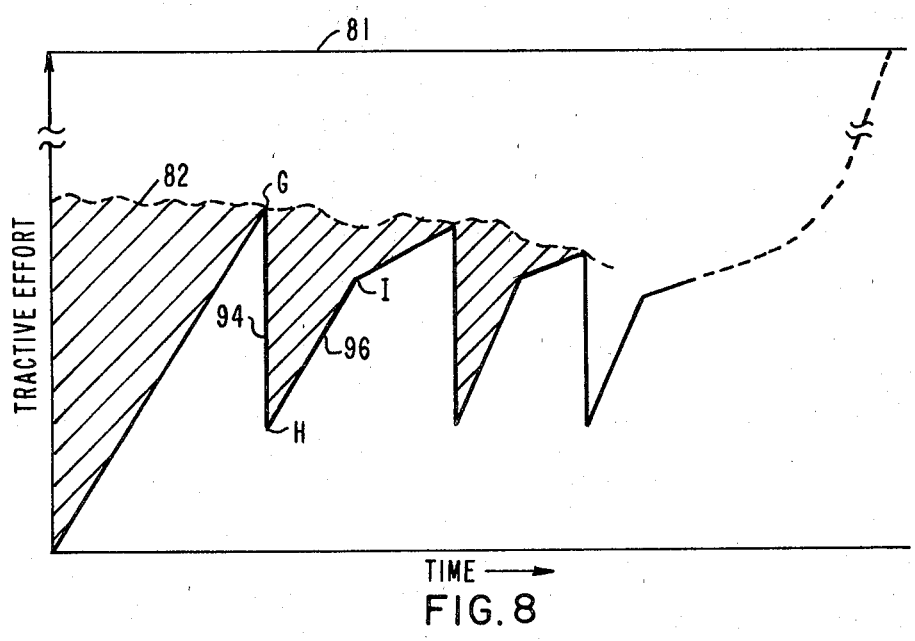
FIG. 8 illustrates another modification of the present slip/slide control apparatus.

In FIG. 8 there is shown a modification of the present invention as provided with the operation of the program listing included in Appendix C to additionally minimize the lost tractive effort time product, as represented by the cross hatched areas under the requested level of tractive effort as shown by curve 81. When a loss of adhesion is sensed by the slip/slide brake blend controller 55 for a given wheel-axle unit, such as occurs at location G on the adhesive limit curve 82, the microprocessor 94 remembers the level of tractive effort at location G and removes tractive effort as shown by curve section 94 to a tractive effort level H which has a predetermined relationship with tractive effort level G, such as one-half. Then tractive effort is reapplied in accordance with curve section 96 until knee I where the rate of tractive effort application is lowered, such as previously described in relation to FIG. 7. This operation repeatedly continues as shown in FIG. 7 until the requested level of tractive effort as shown by curve 81 is achieved.

In each of Appendix A, B and C, there is included an instruction program listing that has been prepared to control the operation of the here disclosed propulsion control apparatus and method. The instruction program listing is written in the assembly language of the Intel 8080 microprocessor. Many of these microprocessors have already been supplied to customers, including technical instruction and descriptive documentation to explain to persons skilled in this art the operation of the microprocessor apparatus. These instruction program listings are included to provide an illustration of suitable embodiments of the present invention. These instruction program listings at the present time are more or less development programs and have not been extensively debugged through the course of practical operation for the real time propulsion control of a vehicle. It is well known by persons skilled in this art that most real time control application programs contain some minor bugs, and it usually takes varying periods of actual operation time to identify and routinely correct the more critical of these bugs.

In relation to the program listing included in the above cross referenced patent application, PI is TER and PO is TERJ of the program listings included in appendices A, B and C.

```
28100;CALLED FROM INT ROUTINE IN THE EVENT OF A SLIP/SLIDE
28200;###############################################
28300
28400 SLIP1:  PUSH    B
28500         PUSH    D
28600         LDA     ?SSLD
28700         MOV     B,A         ;SAVE SSLD IN B
28800         ANI     01H         ;1ST SLIP ?
28900         JNZ     SL2         ;NO
29000
29100;FIRST PASS: SET VALUES FOR PARAMETERS
29200
29300         MOV     A,B         ;GET SSLD
29400         ORI     01H         ;SET CURRENT SLIP/SLIDE BIT
29500         MOV     B,A
29600         LDA     ?TERJ       ;GET ADHESION LIMIT
29700         STA     ?TERJS      ;SAVE IT
29800         MOV     C,A         ;SAVE IT IN C
29900         LDA     ?MODE
30000         ANI     02H         ;IN BRAKE ?
30100         JNZ     BSL
30200
30300;SET POWER PARAMETERS
30400
30500         MVI     A,0C0H
```

```
30600            STA      ?SRAT1      ;SET BELOW KNEE JERK RATE
30700            MVI      A,80H
30800            STA      ?SRAT2      ;SET ABOVE KNEE JERK RATE
30900            MOV      A,C         ;GET ADHESION LIMIT
31000            RRC
31100            RRC
31200            ANI      3FH
31300            MOV      D,A         ;D=.25*LIMIT
31400            ADD      D
31500            ADD      D
31600            STA      ?SLNEE      ;KNEE = .625 * LIMIT
31700            JMP      SLIPD
31800
31900;SET BRAKE PARAMETERS
32000
32100BSL:       MVI      A,0C0H
32200            STA      ?SRAT1      ;SET JERK BELOW KNEE
32300            MVI      A,80H
32400            STA      ?SRAT2      ;SET JERK ABOVE KNEE
32500            MOV      A,C         ;GET ADHESION LIMIT
32600            RRC
32700            RRC
32800            ANI      3FH
32900            MOV      D,A         ;D=.25*LIMIT
33000            RRC
33100            RRC
33200            ANI      0FH         ;A=.0625*LIMIT
33300            ADD      D
33400            ADD      D
33500            ADD      D
33600            STA      ?SLNEE      ;KNEE = .825 * LIMIT
33700            JMP      SLIPD
33800
33900;SECOND PASS.  ORIGINAL PARAMETERS ALREADY SET
34000
34100SL2:       MOV      A,B         ;GET SSLD
34200            ANI      02H         ;ORIGINAL SLIP/SLIDE ?
34300            JZ       SLIPD       ;YES
34400
34500;NOT FIRST SLIP/SLIDE.  MODIFY PARAMETERS
34600
34700            MOV      A,B         ;GET SSLD
34800            ANI      0FDH        ;CLEAR TRACTION ACHIEVED BIT
34900            MOV      B,A
35000            LDA      ?TERJ       ;GET ADHESION LIMIT
35100            STA      ?TERJS      ;STORE IT
35200            MOV      C,A         ;SAVE IT IN C
35300            LDA      ?MODE
35400            ANI      02H         ;BRAKE ?
35500            JNZ      BSL2        ;YES
35600
35700;MODIFY PARAMETERS IN POWER
35800
35900            LDA      ?SRAT1
36000            ADI      20H         ;INCREASE RATE BELOW KNEE
36100            JNC      SL2OK       ;TRAP OVERFLOW
36200            MVI      A,0FFH
```

```
36300 SL2OK:   STA    ?SRAT1
36400          LDA    ?SRAT2    ;DECREASE RATE ABOVE KNEE
36500          RRC
36600          ANI    7FH
36700          CPI    05H       ;RATE TOO LOW ?
36800          JNC    PL3OK     ;NO
36900          MVI    A,04H     ;YES, TRAP
37000 PL3OK    STA    ?SRAT2    ;SRAT2 = .5 * SRAT2
37100          MOV    A,C       ;GET ADHESION LIMIT
37200          RRC
37300          RRC
37400          ANI    3FH
37500          MOV    D,A       ;D=.25*LIMIT
37600          ADD    D
37700          ADD    D
37800          STA    ?SLNEE    ;KNEE = .75 * LIMIT
37900          JMP    SLIPD
38000
38100 ;MODIFY PARAMETERS FOR BRAKE
38200
38300 BSL2:    LDA    ?SRAT1
38400          ADI    30H       ;INCREASE RATE BELOW KNEE
38500          JNC    B2OK      ;TRAP OVERFLOW
38600          MVI    A,0FFH
38700 B2OK     STA    ?SRAT1
38800          LDA    ?SRAT2    ;DECREASE RATE ABOVE KNEE
38900          RRC
39000          ANI    7FH
39100          CPI    05H       ;RATE TOO LOW ?
39200          JNC    BS2OK     ;NO
39300          MVI    A,04H
39400 BS2OK:   STA    ?SRAT2    ;SRAT2=.5*SRAT2
39500          MOV    A,C       ;GET ADHESION LIMIT
39600          RRC
39700          RRC
39800          ANI    3FH
39900          MOV    D,A       ;D=.25*LIMIT
40000          RRC
40100          RRC
40200          ANI    0FH       ;A=.0625 * LIMIT
40300          ADD    D
40400          ADD    D
40500          ADD    D
40600          STA    ?SLNEE    ;KNEE = .825 * LIMIT
40700
40800 SLIPD:   MOV    A,B       ;GET SSLD
40900          ANI    08H       ;CURRENT IMBALANCE ONLY ?
41000          JNZ    SLIDD     ;YES
41100          MVI    A,0DH
41200          STA    ?IR       ;SET IR TO 50 AMPS
41300          MVI    A,00H
41400          STA    ?TERJ     ;RESET TERJ
41500 SLIDD:   MOV    A,B       ;GET SSLD
41600          STA    ?SSLD     ;STORE IT
41700          XRA    A
41800          STA    ?TS6      ;ZERO TIMER
41900          STA    ?SCNT     ;ZERO SLIP/SLIDE COUNTER
```

```
42000           POP     D
42100           POP     B
42200           RET
42400
42500           END
33800;##############################################################
33900;ICONT: PERFORM JERK LIMITING ON TERJ
33910;EXICUTED DURING ODD INTERRUPT
34000;##############################################################
34010
34100 ICONT:   PUSH    B
34200           LDA     ?MODE
34300           MOV     E,A
34400           LDA     ?SSLD
34500           ANI     01H     ;SLIP/SLIDE ?
34600           JNZ     ISLIP   ;YES
34700           LXI     B,02A0H ;JERK OUT OF PWR
34800           MVI     A,0CH   ;MASK UNCONFIRMED + REQ
34900           ANA     E
35000           CPI     08H
35100           JZ      INORM
35200           LXI     B,02A0H ;JERK OUT OF BRK
35300           CPI     0CH
35400           JZ      INORM
35500           LXI     B,02A0H ;JERK IN PWR
35600           MVI     A,03H   ;MASK CONFIRM PWR + BRK
35700           ANA     E
35800           CPI     01H
35900           JZ      INORM
36000           LXI     B,02A0H ;JERK IN BRK
36100           CPI     02H
36200           JZ      INORM
36300           LXI     B,02A0H ;NONE OF THE ABOVE
36400
36500 INORM:   LXI     H,?JEK
36600           MOV     A,M
36700           ADD     C
36800           MOV     M,A
36900           JNC     IJEK    ;NOT THIS TIME
37000
37100           LDA     ?TER
37200           LXI     H,?TERJ
37300           CMP     M
37400           JZ      IJEK
37500           JC      JEK1
37600           MOV     A,M     ;INCREASE ?TERJ
37700           ADD     B
37800           JNC     JTRAP1
37900           MVI     A,0FFH
38000 JTRAP1:  MOV     M,A
38100           JMP     IJEK
38200 JEK1:    LDA     ?SCNT   ;INCREMENT COUNTER
38300           ADI     01H
38400           JNC     TR11    ;TRAP OVERFLOW
38500           MVI     A,0F0H
38600 TR11:    STA     ?SCNT
38700           MOV     A,M
```

```
38800           SUB       B
38900           JNC       JTRAP1
39000           MVI       A,00H
39100           MOV       M,A
39200 IJEK:     POP       B
39300           JMP       IMODE
39310
39320 ;MODIFY JERK RATE IF SLIP/SLIDE
39330
39400 ISLIP:    LXI       H,?TERJ
39500           MVI       A,20H
39600           CMP       M          ;HAS TRACTION BEEN ACHIEVED ?
39700           JNC       IS1        ;NO
39800           LDA       ?SSLD      ;YES
39900           ORI       02H        ;FLAG IT
40000           STA       ?SSLD
40100 IS1:      LDA       ?SLNEE
40200           CMP       M          ;ABOVE KNEE    ?
40300           JC        RT2        ;YES
40400           MVI       B,02H
40500           LDA       ?SRAT1
40600           MOV       C,A        ;SET JERK RATE
40700           JMP       INORM
40800 RT2:      MVI       B,01H      ;JERK ABOVE KNEE
40900           LDA       ?T56
41000           CPI       1EH        ;TIMER > 3 SEC ?
41100           JC        RTT2       ;NO, SAME RATE
41200           LDA       ?SCNT      ;INCREMENT COUNTER
41300           ADI       20H
41400           JNC       TR22
41500           MVI       A,0F0H
41600 TR22:     STA       ?SCNT
41700           XRA       A          ;YES
41800           STA       ?T56       ;RESET TIMER
41900           LDA       ?SRAT2     ;INCREASE RATE
42000           RLC
42100           ANI       0FEH
42200           STA       ?SRAT2
42300           MOV       C,A
42400           JMP       INORM
42500 RTT2:     LDA       ?SRAT2     ;SAME RATE
42600           MOV       C,A
42700           JMP       INORM
35100
35200 ;###############################################
35300 ;SLP:    CREATED   9/3/80
35400 ;CHECKS FOR END OF SLIP/SLIDE
35500 ;CALLED FROM CYCLE
35600 ;###############################################
35700
35800 SLP:      LDA       ?SSLD
35850           MOV       B,A
35900           ANI       01H        ;SLIP/SLIDE ?
36000           RZ                   ;NO
36050           LDA       ?SCNT
36200           CPI       80H
36300           RC
```

```
36500           XRA     A
36600           STA     ?SSLD      ;YES, CLEAR SLIP/SLIDE FLAG
36700           RET
36800           END
36900
28100;CALLED FROM INT ROUTINE IN THE EVENT OF A SLIP/SLIDE
28200;################################################
28300
28400SLIP1:    PUSH    B
28500           PUSH    D
28600           LDA     ?SSLD
28700           MOV     B,A        ;SAVE SSLD IN B
28800           ANI     01H        ;1ST SLIP ?
28900           JNZ     SL2        ;NO
29000
29100;FIRST PASS: SET VALUES FOR PARAMETERS
29200
29300           MOV     A,B        ;GET SSLD
29400           ORI     01H        ;SET CURRENT SLIP/SLIDE BIT
29500           MOV     B,A
29600           LDA     ?TERJ      ;GET ADHESION LIMIT
29700           STA     ?TERJS     ;SAVE IT
29800           MOV     C,A        ;SAVE IT IN C
29810           RRC
29820           ANI     7FH        ;A = .5 *ADHESION LIMIT
29830           STA     ?TERJL     ;SAVE IT AS TERJ LOW
29900           LDA     ?MODE
30000           ANI     02H        ;IN BRAKE ?
30100           JNZ     BSL
30200
30300;SET POWER PARAMETERS
30400
30500           MVI     A,0C0H
30600           STA     ?SRAT1     ;SET BELOW KNEE JERK RATE
30700           MVI     A,80H
30800           STA     ?SRAT2     ;SET ABOVE KNEE JERK RATE
30900           MOV     A,C        ;GET ADHESION LIMIT
31000           RRC
31100           RRC
31200           ANI     3FH
31300           MOV     D,A        ;D=.25*LIMIT
31400           ADD     D
31500           ADD     D
31600           STA     ?SLNEE     ;KNEE = .625 * LIMIT
31700           JMP     SLIPD
31800
31900;SET BRAKE PARAMETERS
32000
32100BSL:      MVI     A,0C0H
32200           STA     ?SRAT1     ;SET JERK BELOW KNEE
32300           MVI     A,80H
32400           STA     ?SRAT2     ;SET JERK ABOVE KNEE
32500           MOV     A,C        ;GET ADHESION LIMIT
32600           RRC
32700           RRC
32800           ANI     3FH
32900           MOV     D,A        ;D=.25*LIMIT
```

```
33000           RRC
33100           RRC
33200           ANI     0FH         ;A=.0625*LIMIT
33300           ADD     D
33400           ADD     D
33500           ADD     D
33600           STA     ?SLNEE      ;KNEE = .825 * LIMIT
33700           JMP     SLIPD
33800
33900;SECOND PASS. ORIGINAL PARAMETERS ALREADY SET
34000
34100SL2:       MOV     A,B         ;GET SSLD
34200           ANI     02H         ;ORIGINAL SLIP/SLIDE ?
34300           JZ      SLIPD       ;YES
34400
34500;NOT FIRST SLIP/SLIDE. MODIFY PARAMETERS
34600
34700           MOV     A,B         ;GET SSLD
34800           ANI     0FDH        ;CLEAR TRACTION ACHIEVED BIT
34900           MOV     B,A
35000           LDA     ?TERJ       ;GET ADHESION LIMIT
35100           STA     ?TERJS      ;STORE IT
35200           MOV     C,A         ;SAVE IT IN C
35300           LDA     ?MODE
35400           ANI     02H         ;BRAKE ?
35500           JNZ     BSL2        ;YES
35600
35700;MODIFY PARAMETERS IN POWER
35800
35900           LDA     ?SRAT1
36000           ADI     20H         ;INCREASE RATE BELOW KNEE
36100           JNC     SL2OK       ;TRAP OVERFLOW
36200           MVI     A,0FFH
36300SL2OK:     STA     ?SRAT1
36400           LDA     ?SRAT2      ;DECREASE RATE ABOVE KNEE
36500           RRC
36600           ANI     7FH
36700           CPI     05H         ;RATE TOO LOW ?
36800           JNC     PL3OK       ;NO
36900           MVI     A,04H       ;YES, TRAP
37000PL3OK:     STA     ?SRAT2      ;SRAT2 = .5 * SRAT2
37100           MOV     A,C         ;GET ADHESION LIMIT
37200           RRC
37300           RRC
37400           ANI     3FH
37500           MOV     D,A         ;D=.25*LIMIT
37600           ADD     D
37700           ADD     D
37800           STA     ?SLNEE      ;KNEE = .75 * LIMIT
37900           JMP     SLIPD
38000
38100;MODIFY PARAMETERS FOR BRAKE
38200
38300BSL2:      LDA     ?SRAT1
38400           ADI     30H         ;INCREASE RATE BELOW KNEE
38500           JNC     B2OK        ;TRAP OVERFLOW
38600           MVI     A,0FFH
```

```
38700B20K:      STA     ?SRAT1
38800           LDA     ?SRAT2      ;DECREASE RATE ABOVE KNEE
38900           RRC
39000           ANI     7FH
39100           CPI     05H         ;RATE TOO LOW ?
39200           JNC     BS30K       ;NO
39300           MVI     A,04H
39400BS30K:     STA     ?SRAT2      ;SRAT2=.5*SRAT2
39500           MOV     A,C         ;GET ADHESION LIMIT
39600           RRC
39700           RRC
39800           ANI     3FH
39900           MOV     D,A         ;D=.25*LIMIT
40000           RRC
40100           RRC
40200           ANI     0FH         ;A=.0625 * LIMIT
40300           ADD     D
40400           ADD     D
40500           ADD     D
40600           STA     ?SLNEE      ;KNEE = .825 * LIMIT
40700
40800SLIPD:    MOV     A,B         ;GET SSLD
40900           ANI     08H         ;CURRENT IMBALANCE ONLY ?
41000           JNZ     SLIDD       ;YES
41300           LDA     ?TERJL      ;GET LOW LIMIT
41400           STA     ?TERJ       ;USE IT FOR TERJ
41500SLIDD:    MOV     A,B         ;GET SSLD
41600           STA     ?SSLD       ;STORE IT
41700           XRA     A
41800           STA     ?TS6        ;ZERO TIMER
41900           STA     ?SCNT       ;ZERO SLIP/SLIDE COUNTER
42000           POP     D
42100           POP     B
42200           RET
42400
42500           END
```

What we claim is:

1. In propulsion control apparatus for a vehicle controlled by a tractive effort request signal and having at least two support wheel assemblies operative with a track with respective speed signal providing tachometers being coupled with each of the wheel assemblies, the combination of:
    means responsive to the tractive effort request signal for applying tractive effort between at least two wheel assemblies of the vehicle and the track;
    means for sensing a predetermined speed relationship between said two wheel assemblies of the vehicle resulting from the occurrence of a loss of adhesion between at least one wheel assembly and the track;
    means for remembering the level of the applied tractive effort when said loss of adhesion occurred; and
    means for reapplying the tractive effort through at least one of said wheel assemblies at a first acceleration rate up to a tractive effort level less than said remembered level and then at a second acceleration rate different, than said first acceleration rate.

2. The propulsion control apparatus of claim 1;
    with said tractive effort reapplying means being operative to reapply tractive effort at said first rate up to a predetermined percentage of said level and then to reapply tractive effort at a second rate lower than said first rate.

3. The propulsion control apparatus of claim 1;
    with said tractive effort reapplying means being operative to reapply tractive effort at a higher acceleration first rate up to a tractive effort less than said level and then to reapply tractive effort at a lower acceleration second rate until one of a loss of adhesion with said track occurs or the requested tractive effort in accordance with said tractive effort request signal is reached.

4. The propulsion control apparatus of claim 1;
    with said tractive effort reapplying means operating to remove the applied tractive effort in relation to at least said one wheel assembly upon the occurrence of said loss of adhesion before reapplying said tractive effort at said first rate in accordance with a predetermined percentage of said level of applied tractive effort.

5. The propulsion control apparatus of claim 1;
    with said tractive effort reapplying means being operative to repeatedly remove and then reapply tractive effort each time said loss of adhesion occurs and then for each predetermined time period that passes without such a loss of adhesion the next acceleration rate is increased as a predetermined percentage of the previous acceleration rate.

6. The propulsion control apparatus of claim 1; with said first rate for each of successive reapplications of tractive effort after respective losses of adhesion being at an increased acceleration rate.

7. In the method of controlling the tractive effort between a vehicle and a support track for that vehicle in response to a tractive effort request signal, the steps of:

applying tractive effort at a first acceleration rate between said vehicle and the track in response to the tractive effort request signal;

sensing the occurrence of a loss of adhesion between the vehicle and the track;

removing at least part of the applied tractive effort when a loss of adhesion is sensed and remembering the tractive effort level when said loss of adhesion occurred; and reapplying the tractive effort between said vehicle and the track at a second acceleration rate at least as high as said first rate up to a tractive effort level less than the remembered level and then applying the tractive effort between said vehicle and the track at a third rate lower than said first rate.

8. The tractive effort control method of claim 7 with the application of the tractive effort at said third rate continuing until the requested tractive effort is reached or a predetermined time interval has passed.

9. The tractive effort control method of claim 7 with the tractive effort being reapplied at said second rate after each said loss of adhesion up to a predetermined percentage of said remembered level at said second rate and then applied at least at said third rate until one of another such loss of adhesion is sensed or the requested tractive effort is realized.

10. The tractive effort control method of claim 7 with the tractive effort being reapplied after each said loss of adhesion and then for each of predetermined time periods following a loss of adhesion a predetermined increase in the acceleration rate is provided up to a desired maximum acceleration rate for the vehicle.

* * * * *